US005358141A

United States Patent [19]

Carlson et al.

[11] Patent Number: 5,358,141

[45] Date of Patent: Oct. 25, 1994

[54] SUPPORT OR ATTACHMENT MEANS FOR A SHEET DISPENSER

[75] Inventors: Casey L. Carlson, Edina; Thomas L. Connolly, St. Paul, both of Minn.

[73] Assignee: Minnesota Mining and Manufacturing Company, St. Paul, Minn.

[21] Appl. No.: 63,519

[22] Filed: May 18, 1993

[51] Int. Cl.[5] .................... A01C 1/00

[52] U.S. Cl. .................... 221/185; 221/47; 221/284; 248/181; 248/910; 224/218; 224/219; 206/449

[58] Field of Search .................... 221/185, 45, 46, 47, 221/284, 286; 248/181, 910; 206/449; 222/175; 224/218, 219, 221; 211/50

[56] References Cited

U.S. PATENT DOCUMENTS

| | | | |
|---|---|---|---|
| 606,914 | 7/1898 | Bragger | 248/181 |
| 2,356,722 | 8/1944 | Harris | 222/175 X |
| 2,908,519 | 10/1959 | Holden | 248/181 |
| 3,737,130 | 6/1973 | Shiraishi | 248/181 |
| 3,826,407 | 7/1974 | Keating | 224/219 X |
| 4,136,805 | 1/1979 | Storms | 224/219 |
| 4,401,233 | 8/1983 | Frey | 221/185 X |
| 4,595,154 | 6/1986 | Swope | 248/910 X |
| 4,907,825 | 3/1990 | Miles et al. | 281/51 |
| 4,928,864 | 5/1990 | Walker et al. | 224/218 X |
| 5,014,946 | 5/1991 | Gruber | 248/206 |
| 5,086,946 | 2/1992 | Blackwell et al. | 221/45 |
| 5,127,545 | 7/1992 | French | 221/185 X |
| 5,165,570 | 11/1992 | Windorski et al. | 221/46 |
| 5,222,643 | 6/1993 | Platt | 224/218 |

FOREIGN PATENT DOCUMENTS

| | | | |
|---|---|---|---|
| 1016522 | 11/1952 | France | 221/45 X |

*Primary Examiner*—Robert P. Olszewski
*Assistant Examiner*—Dean A. Reichard
*Attorney, Agent, or Firm*—Gary L. Griswold; Walter N. Kirn; William L. Huebsch

[57] ABSTRACT

A dispenser for flexible sheets from a stack of adhesive coated sheets disposed one on top of another. The dispenser comprises a first housing portion including a bottom wall, end walls, side walls and a first top wall portion; and a second housing portion comprising a second top wall portion mounted on the first housing portion for movement between a normal position where the top wall portions define an outlet opening for the sheets between adjacent ends, and an open position with the second top wall portion spaced from the first wall portion to afford inserting a stack of sheets into the cavity. The dispenser includes attaching means adapted for releasably attaching the dispenser to several different retaining means including a strap by which the dispenser can be secured on a user's hand or wrist; a support member adapted to be held between user's fingers; a weighted base; or a base adapted to be attached to a surface by various means such as adhesive, suction cups or magnetic material.

12 Claims, 10 Drawing Sheets

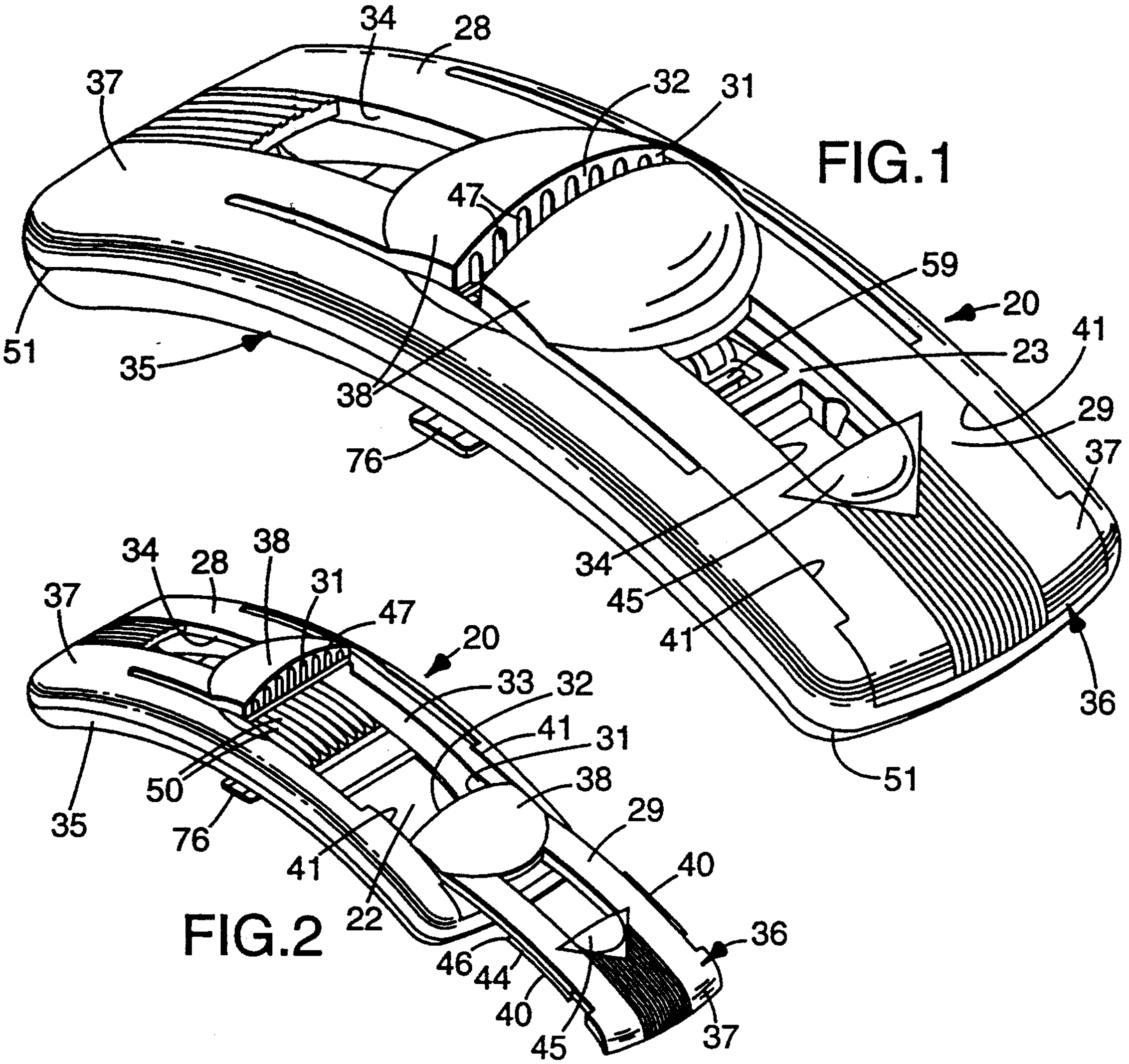
FIG.1
FIG.2
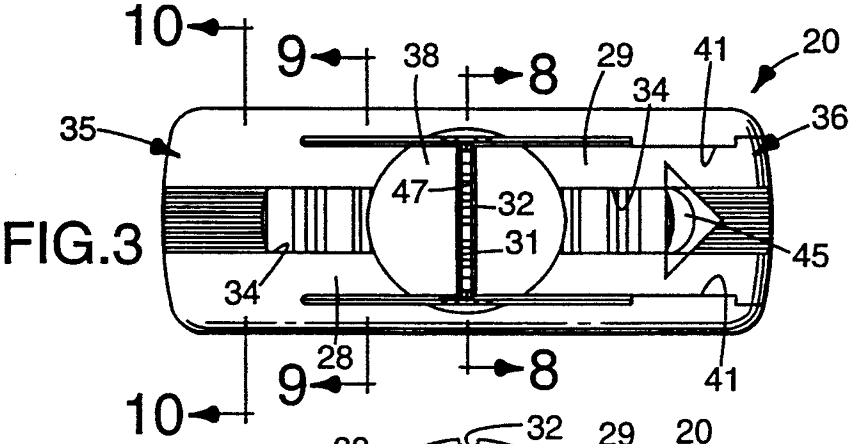
FIG.3
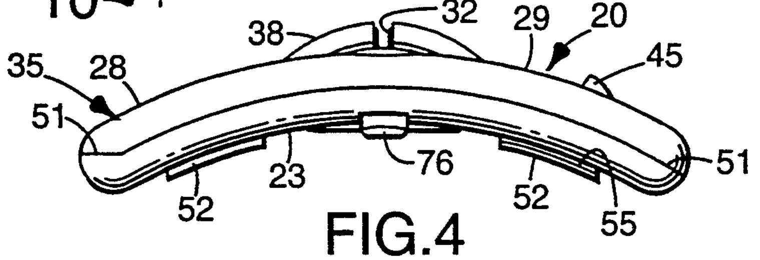
FIG.4

SUPPORT OR ATTACHMENT MEANS FOR A SHEET DISPENSER

TECHNICAL FIELD

The present invention relates generally to dispensers for pressure sensitive adhesive coated sheets and retaining means to which such dispensers can be attached to releasably retain them at predetermined locations.

BACKGROUND ART

Refillable dispensers adapted to dispense pressure sensitive adhesive coated sheets are known, as are retaining means to which such dispensers can be attached to releasably retain them at predetermined locations. U.S. Pat. No. 5,086,946 issued Feb. 11, 1992, (the content whereof is incorporated herein by reference) describes such a dispenser, and includes a discussion of the background art relating to such dispensers.

DISCLOSURE OF THE INVENTION

The present invention provides an improved dispenser from which sheets in a stack of sheets of the type described in U.S. Pat. Nos. 5,086,946 or 4,907,825 can be dispensed, together with improved and novel retaining means to which the dispenser can be attached, and by which the dispenser can be positioned at predetermined locations, such as along the back of a user's hand or wrist, or along a vertical or horizontal surface.

According to the present invention there is provided a dispenser for pressure sensitive adhesive coated flexible sheets from a stack of such sheets adhered one on top of another, which sheets may, for example be used for securing gift wrapping paper, marking electrical wire, or highlighting portions of a document. The dispenser comprises walls having surfaces defining a cavity adapted to receive the stack, which walls can include an arcuate bottom wall defining a bottom surface for the cavity and an opposite generally cylindrically convex outer surface, end walls defining end surfaces for the cavity at opposite ends of the bottom surface, first and second arcuate top wall portions normally both in normal positions extending generally toward each other from the end walls and defining arcuate top surface portions for the cavity spaced from the bottom surface, which top wall portions in their normal positions have spaced adjacent end surfaces defining an outlet opening from the cavity between the top wall portions, and opposite side walls defining opposing side surfaces for the cavity extending between the top surface portions and the bottom surface. The surfaces defining the cavity are shaped to afford longitudinal movement of the stack of sheets within the cavity in response to a force manually applied to the second end portion of the uppermost sheet on the stack projecting through the opening so that the uppermost sheet on the stack can be manually pulled through the opening and will carry with it the second end portion of the sheet beneath it on the stack to which the uppermost sheet is adhered by the adhesive coating, placing that second end portion in a position where it also may be grasped and pulled to withdraw that sheet from the stack. The dispenser comprises a first housing portion including its bottom wall, end walls, side walls and first top wall portion, a second housing portion comprising the second top wall portion which is mounted on the first housing portion for relative movement between its normal position and an open position spaced from the first wall portion to afford inserting a stack of sheets in the cavity, and means for releasably retaining the second top wall portion in its normal position.

In the dispenser described in this application the arcuate top wall portions include base parts adjacent the end walls and flexible cantilever parts extending toward each other from those base parts adapted to deflect in response to forces applied to the stack to remove the uppermost sheet from the dispenser to thereby decrease the amount of force required to remove the uppermost sheet from the dispenser. The base part of the first top wall portion is fixed to the side walls. The base part of the second top wall portion is fixed with respect to the side walls when it is in its normal position and is mounted on the side walls for longitudinal sliding movement between its normal and open positions, and the means for releasably retaining the second top wall portion in its normal position comprises latch parts mounted on the base part of the second top wall portion and on the first housing portion adapted for releasable engagement to releasably retain the second top wall portion in its normal position.

The first and second top wall portions can have pairs of parallel ribs extending generally parallel to the side walls to define portions of the arcuate top surface portions for the cavity. Such ribs restrict adhesive on the sheets from transferring to the top surface portions, and tend to guide movement of the stack in the cavity as sheets are withdrawn from the dispenser, which is particularly useful when only a small number of sheets remain in the stack.

Also, the side walls can have top edges adjacent and unattached to the top wall portions, and the ribs can be spaced smaller distances from the bottom wall than the top edges of the side walls so that the ribs restrict sheets on the stack from becoming wedged between the top surfaces and the top wall portions.

The dispenser further includes attaching means adapted for releasably attaching it to several different retaining means adapted for releasably retaining the dispenser at various predetermined locations including attached to a surface, attached along the back of a user's hand or wrist, or supported on a horizontal surface. Those attaching means include (1) two transversely extending loop like portions of the dispensers bottom wall, each adjacent a different one of its end walls. The bottom wall has transverse openings along opposite edges of the loop like portions affording positioning a strap around the sides of said loop like portions adjacent the cavity by which strap the dispenser can be releasably secured with the outer surface of the bottom wall along the top surface of a user's hand or wrist with the strap extending around the palm of the user's hand or around the user's wrist. Also included in those attaching means are (2) two transversely extending openings in the bottom wall partially defined by lip like portions of the bottom wall that extend toward the end walls of the dispenser on opposite sides of the central opening. The lip-like portions of the bottom wall are adapted to be engaged by opposed hook-like distal end portions of a novel support member. That support member has finger engagement surfaces that face in opposite directions on opposite sides, which finger engagement surfaces are shaped to engage adjacent side surfaces of a user's fingers. The support member includes a narrow web like portion between the finger engagement surfaces adapted to comfortably extend between a user's fingers positioned along the finger engagement surfaces. Also, the support member has a retainer portion that is wider than the web like portion and is adapted to be positioned along the inner surfaces of a user's fingers. Using this support member, a person can comfortably and conveniently hold the dispenser along the outer surface of his fingers, while retaining almost complete use of his fingers to accomplish a task, such as applying wrapping material to a package that will be attached in place by pressure sensitive adhesive coated sheets from the dispenser. Additionally, the attaching means includes (3) two docking tabs extending in opposite directions from opposite sides of the bottom wall and centrally along the bottom wall. Those docking tabs are adapted to be releasably engaged under locking tabs in a base having a slot in which the bottom wall of the dispenser can be inserted or removed by moving its bottom wall longitudinally into or out of the slot. Such a base can either be weighted and adapted to be supported on a horizontal surface, or can be un-weighted and adapted to be attached to a surface by means such as adhesive, a suction cup or magnetic material.

BRIEF DESCRIPTION OF THE DRAWING

The present invention will be further described with reference to the accompanying drawing wherein like reference numerals refer to like parts in the several views, and wherein:

FIGS. 1 and 2 are perspective views of a first embodiment of a sheet dispenser according to the present invention respectively showing a second housing portion of the dispenser in a normal and open position relative to a first housing portion of the dispenser;

FIG. 3 is a reduced top view of the dispenser of FIG. 1;

FIG. 4 is a reduced side view of the dispenser of FIG. 1;

DETAILED DESCRIPTION

Figure 5:
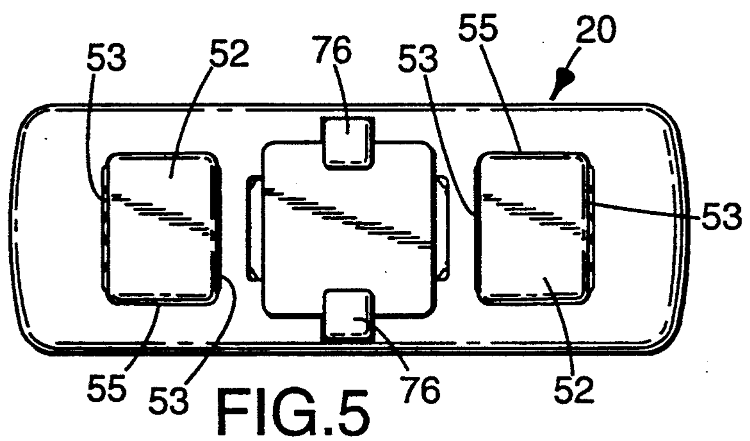
FIG. 5 is a reduced bottom view of the dispenser of FIG. 1.
Figure 6:
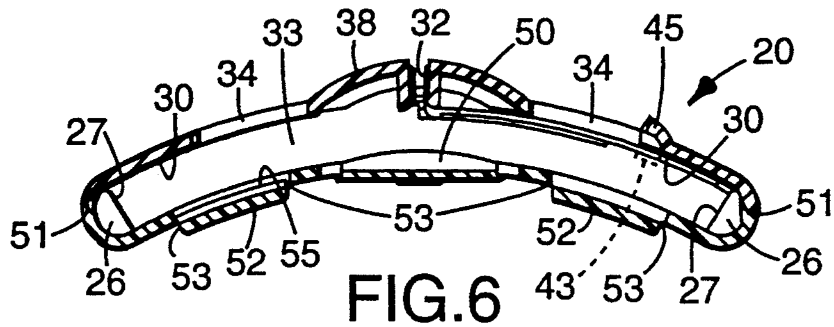
FIG. 6 is a sectional view taken approximately along line 6—6 of FIG. 3.
Figure 7:
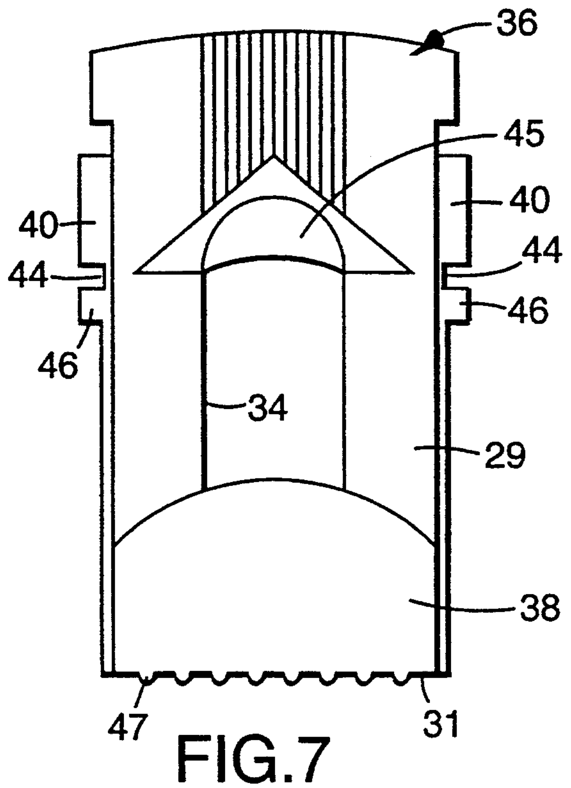
FIG. 7 shows the second housing portion of the dispenser removed from the first housing portion of the dispenser.
Figure 8:
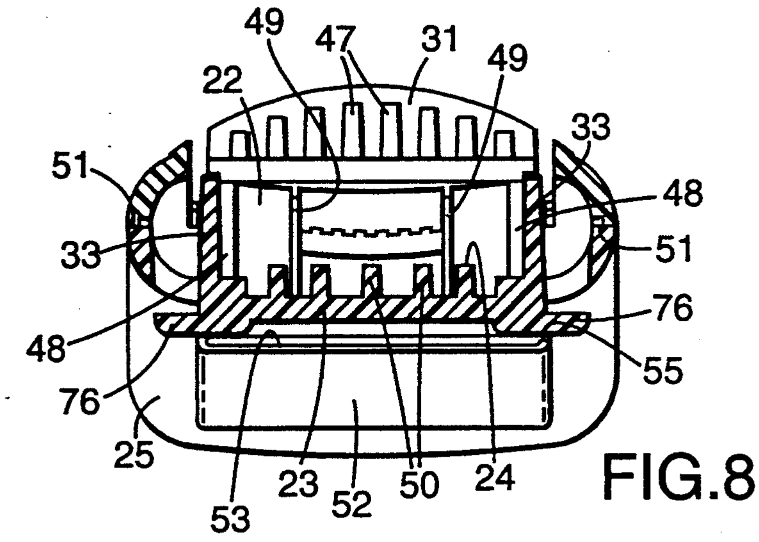
FIGS. 8, 9 and 10 are cross sectional views respectively taken approximately along lines 8—8, 9—9 and 10—10 of FIG. 3.
Figure 9:
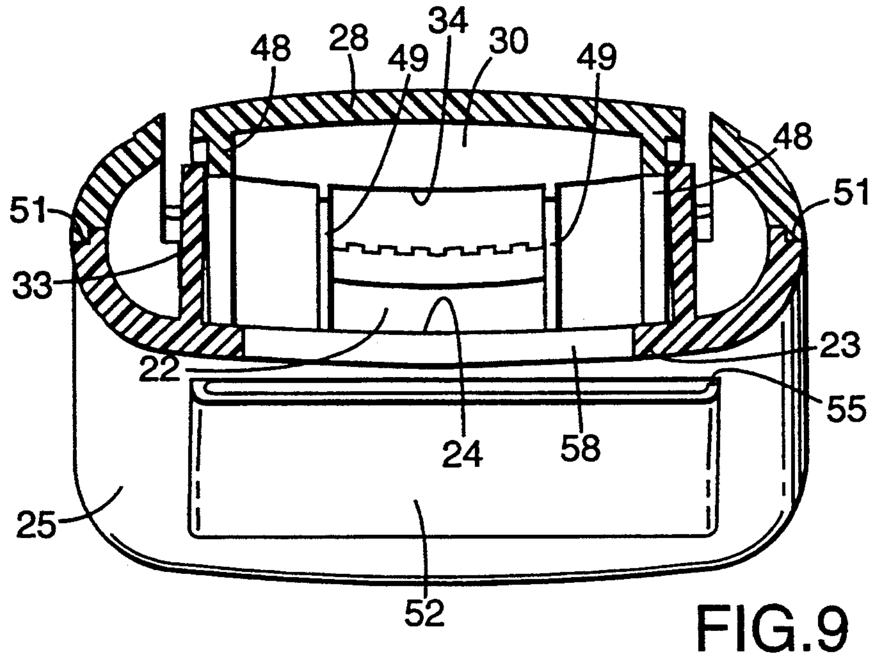
Figure 10:
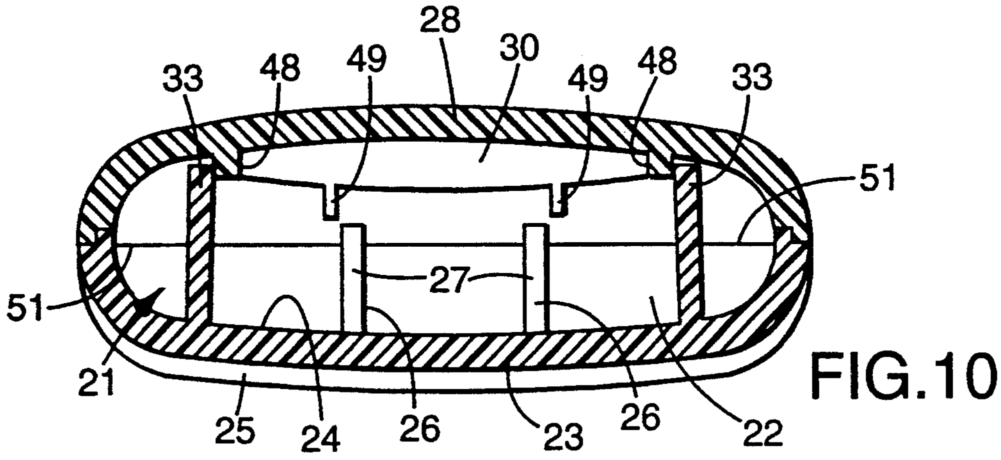

Referring now to the drawing and in particular to FIGS. 1 through 10, there is shown a dispenser according to the present invention generally designated by the reference numeral 20. The dispenser 20 can be used for dispensing flexible sheets from a stack 10 of sheets (see FIGS. 11–18) of the type described in U.S. Pat. No. 5,086,946, the portion of which patent describing those sheets is incorporated herein by reference, with the same reference numerals being used in this application as in that patent to describe parts of the sheets and stack 10.

Generally, as can be seen in FIG. 3A of U.S. Pat. No. 5,086,946, the stack 10 is of sheets 11 disposed one on top of another, with each sheet 11 comprising a backing B having first and second opposite major side surfaces 3 and 5 and first and second opposite ends 4 and 6 with the first end 4 of each sheet 11 being in alignment with the second end 6 of an adjacent sheet 11 in the stack 10, and a layer 2 of adhesive permanently adhered to the first side surface 3 of the sheet backing B. The layer 2 of adhesive of each sheet 11 is releasably adhered along the second surface 5 of the adjacent sheet 11 in the stack 10. The sheets 11 comprise release means in the form of premium low adhesion backsize 1' for providing a first adhesion level (which may be no adhesion) along a first end portion 15 of each of the sheets 11 adjacent the first end 4 of the backing B between the layer 2 of adhesive and the second side surface 5 of the adjacent sheet 11 in the stack 10 to which the layer 2 of adhesive is releasably adhered, which first adhesion level provides a sufficiently low release force between the layer 2 of adhesive and the adjacent sheet 11 to which the layer 2 of adhesive is releasable adhered to afford sliding movement between the side surfaces 3 and 5 of the adjacent sheets 11 along the first end portion 15, and attachment means for providing a second adhesion level along a second end portion 17 of each of the sheets 11 adjacent the second end 6 of the backing B between the layer 2 of adhesive and the second side surface 5 of the adjacent sheet 11 in the stack 10 to which the layer 2 of adhesive is releasably adhered, which second adhesion level provides a release force that is higher than the low release force along the first end portion 15 and firmly adheres the sheet 11 to the adjacent sheet 11 in the stack 10 during sliding movement of the sheet 11 relative to the adjacent sheet 11 along the first end portion 15 while affording peeling away of the sheet 11 from the stack 10 along the second end portion 17. Alternatively, the stack of sheets could be the stack described in U.S. Pat. No. 4,907,825 (i.e., the stack of sheets sold in a dispenser under the trade designation "Post-it" (TM) Tape Flags) the content of which U.S. Pat. No. 4,907,825 is incorporated herein by reference.

The dispenser 20 comprises walls having surfaces defining a cavity 22 which is adapted to receive the stack 10. Those walls include a generally arcuate bottom wall 23 defining a generally cylindrically convex bottom surface 24 for the cavity 22 and an opposite generally cylindrically convex outer surface 25, end walls 26 defining end surfaces 27 for the cavity 22 at opposite ends of the bottom surface 24, and first and second arcuate top wall portions 28 and 29 normally both in normal positions extending generally toward each other from the end walls 26 and defining arcuate top surface portions 30 for the cavity 22 spaced from the bottom surface 24. The top wall portions 28 and 29 in their normal positions have spaced adjacent end surfaces 31 defining an outlet opening 32 for the cavity 22 between the top wall portions 28 and 29. Also the top wall portions 28 and 29 have central through openings 34 so that a user can see the stack 10 in the cavity 22 to determine the number of sheets 11 remaining in it. The walls of the dispenser 20 include opposite side walls 33 defining opposing side surfaces for the cavity 22 extending between the top surface portions 30 and the bottom surface 24. The surfaces defining the cavity 22 are shaped to afford longitudinal reciprocating movement of the stack 10 of sheets 11 within the cavity 22 in response to a force manually applied to the second end portion 15 of the uppermost sheet 11 in the stack 10 projecting through the opening 32 (see FIGS. 11 through 18) so that the uppermost sheet 11 in the stack 10 can be manually pulled through the opening 32 and will carry with it the second end portion 15 of the sheet 11 beneath it in the stack 10 to which the uppermost sheet 11 is adhered by the coating 2 of adhesive, placing that second end portion 15 in a position where it also may be grasped and pulled to withdraw that sheet 11 from the stack 10.

The dispenser 20 comprises a first housing portion 35 including the bottom wall 23, the end walls 26, side walls 33 and the first top wall portion 28; a second housing portion 36 (shown separated from the first housing portion 35 in FIG. 7) comprising the second top wall portion 29; and means mounting the second housing portion 36 or second top wall portion 36 on the first housing portion 35 for relative movement between the normal position of the housing portions 35 and 36 (FIGS. 1,3 and 4) and an open position of the housing portions 35 and 36 (FIG. 2) with the second top wall portion 29 spaced from the first wall portion 28 to uncover an opening in the first housing portion 35 through which a stack 10 of sheets 11 can be inserted into the cavity 22. Also included are means for releasably retaining the housing portions 35 and 36 in their normal positions. As illustrated, the arcuate wall portions 28 and 29 include base parts 37 adjacent the end walls 26 and flexible cantilever parts 38 extending toward each other from the base parts 37 that are adapted to deflect in response to forces applied to the stack 10 to remove the uppermost sheet 11 from the dispenser 20 and thereby decrease the amount of force required to remove the uppermost sheet 11 from the dispenser 20. The base part 37 of the first top wall portion 28 is fixed relative to the side walls 33, whereas the base part 37 of the second top wall portion 29 is releasably attached in a fixed position relative to the side walls 33 when the second housing portion 36 of second top wall portion 29 is in its normal position, and is mounted on the first housing portion 35 for longitudinal sliding movement between the normal and open positions of the second top wall portion 29 or second housing portion relative to the first housing portion 35.

The means for mounting the second housing portion 36 or second top wall portion 29 on the first housing portion 35 for longitudinal sliding movement between the normal and open positions of the second top wall portion 29 or second housing portion 36 include flange portions 40 extending transversely outwardly along opposite sides of the second top wall portion 29 adapted to slide between the top edges of the side walls 33 that are opposite the bottom wall 23 and flange portions 41 of the first housing portion 35 that extend over those top edges of the side walls 33.

The means for releasably retaining the second top wall portion 29 in its normal position comprises latch parts including tabs 43 projecting toward the cavity 22 from the sides of the flange portions 41 of the first housing portion 35 which are releasably received in openings 44 along the flange portions 40 on the second top wall portion 29 when the second top wall portion 29 is in its normal position. When a user presses the second top wall portion 29 toward its open position at a lug 45 along its top surface, latch parts 46 of the flange portions 40 on the sides of the openings 44 adjacent the end surface 31 will deflect and move past the tabs 43, which deflection will be assisted by a component of the opening force applied to the lug 45 pressing the flanges 40 toward the ends of the tabs 43; and when the second top wall portion 29 is moved back from its open to its normal position, the latch parts 46 of the flange portions 40 will again deflect and move past the tabs 43 so that the tabs 43 can again move back into the openings 44 to again releasably retain the second top wall portion 29 in its normal position.

The end surfaces 31 of the top wall portions 28 and 29 are defined by a plurality of spaced bars 47 which restrict the coating 2 of adhesive on the sheets 11 from "wetting" the opposed end surfaces 31. Such "wetting" could make it difficult to dispense the sheets 11 because of adhesion of the sheets 11 to the dispenser 20.

The inner or top surface portions 30 on the first and second arcuate top wall portions 28 and 29 are each partially defined by distal and proximal pairs of longitudinally extending parallel spaced ribs 48 and 49 included in the arcuate top wall portions 28 and 29, which ribs 48 and 49 project toward the bottom wall 23. The upper surface of the stack 10 of sheets 11 bears against the ribs 48 and 49 as the stack 10 moves within the cavity 22 as a sheet 11 is withdrawn from the dispenser 20. The ribs 48 and 49 restrict adhesive on the sheets 11 from transferring to the top surface portions 30. Also the ribs 48 and 49 tend to guide movement of stacks 10 that have only small numbers of sheets 11 remaining so that such stacks 10 move in directions parallel with the ribs 48 and 49 as sheets 11 are withdrawn from the dispenser 20. The proximal pairs of ribs 49 are more closely spaced than, and are centered between, the distal pairs of ribs 48, and the distal pairs of ribs 48 normally are more closely spaced from the bottom wall 23 than the top edges of the side walls 33. When only a small number of sheets 11 remain in the stack 10, the ribs 48 thus projecting to below the top edge of the side walls 33 insures that the side edges of the sheets 11 will not become jammed in the space along the top edge of one of the side walls 33.

The inner or bottom surface 24 of the bottom wall 23 is in part defined by the arcuate top surfaces opposite the outlet opening 32 of transversely spaced longitudinally extending ribs 50. The ribs 50 defining the central portion of the bottom wall 23 and the ribs 48 and 49 partially defining the inner or top surface portions 30 of the arcuate top wall portions 28 and 29 can be sized and shaped to provide a desired arcs for the top surface portions 30 and bottom surface 24 defining the cavity 22 to accommodate stacks 10 of different numbers of sheets 11 between those top surface portions 30 of the first and second arcuate top wall portions 28 and 29 and bottom surface 24 of the bottom wall 23.

The second housing portion 36 or second top wall portion 29 may be a unitary molded structure (e.g., a polymeric molding of polystyrene), and the first housing portion 35 may be formed of two such unitary moldings (one including the bottom wall 23, the side walls 33 and the end walls 26; and the other the first top wall portion 28) that have mating peripheries 51 at which the two unitary moldings are glued or heat fused together.

Figure 11:
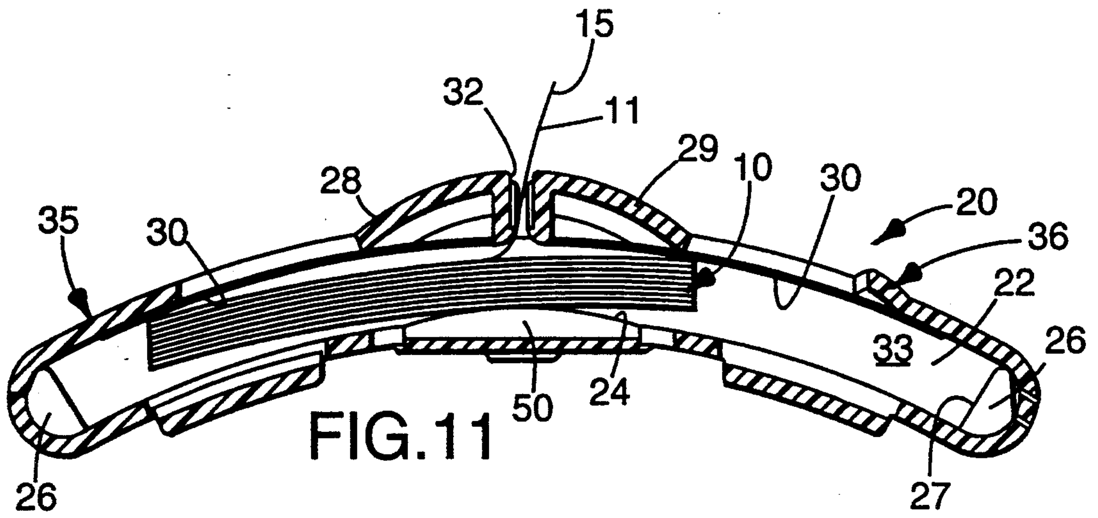
FIGS. 11–18 are sectional views taken approximately along line 6—6 of FIG. 3 that sequentially illustrate dispensing a sheet from the dispenser of FIG. 1.
Figure 12:
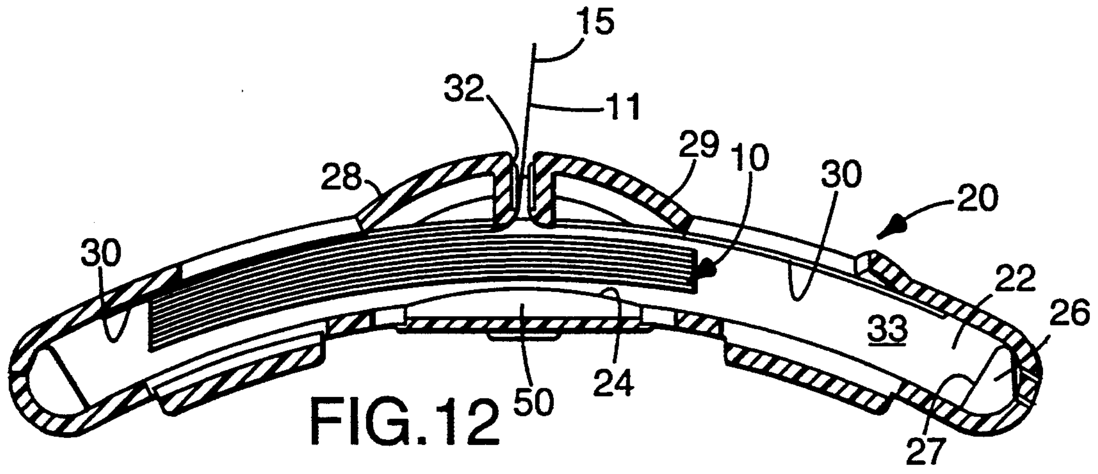
Figure 13:
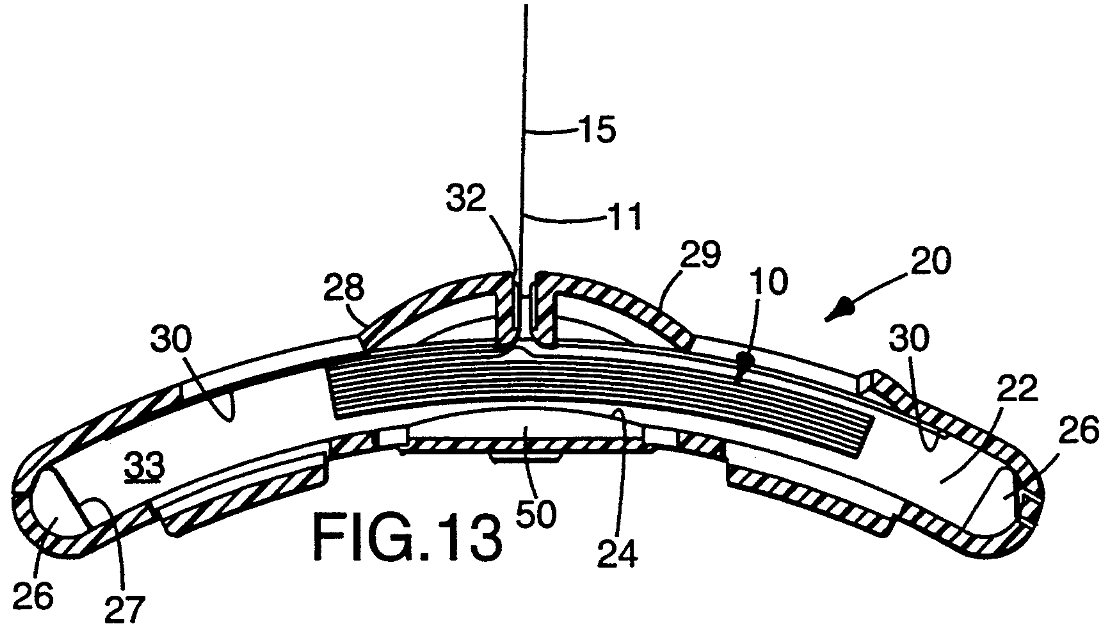
Figure 14:
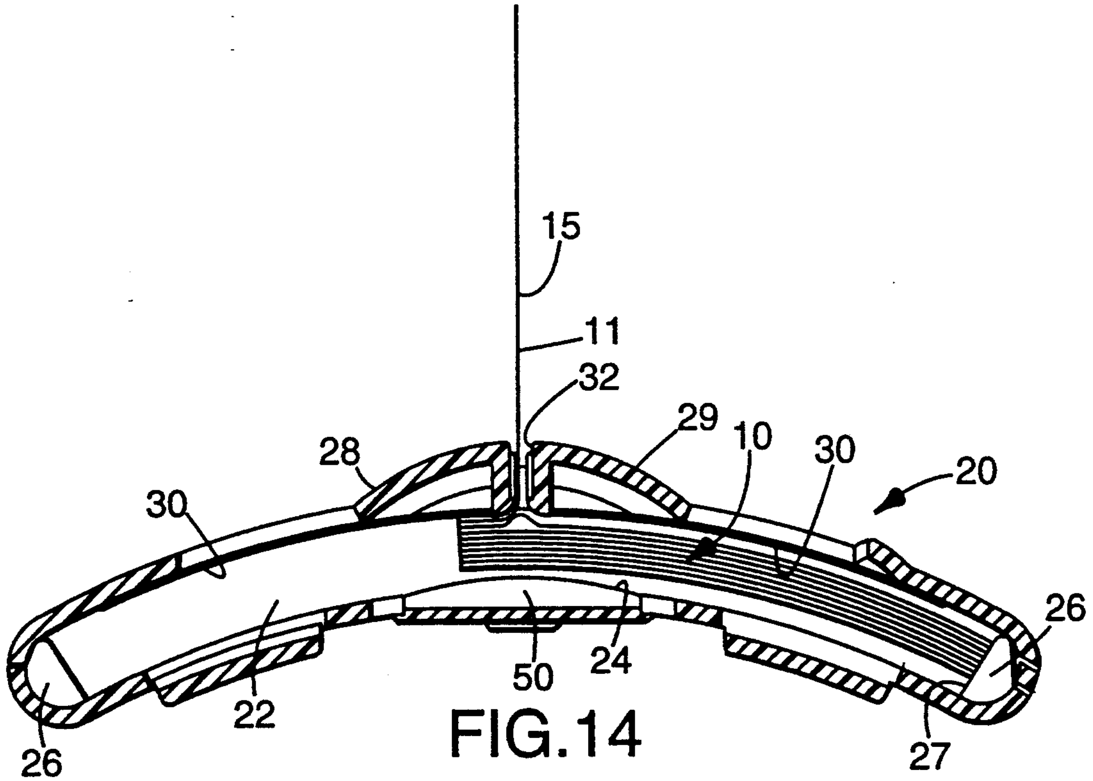
Figure 15:
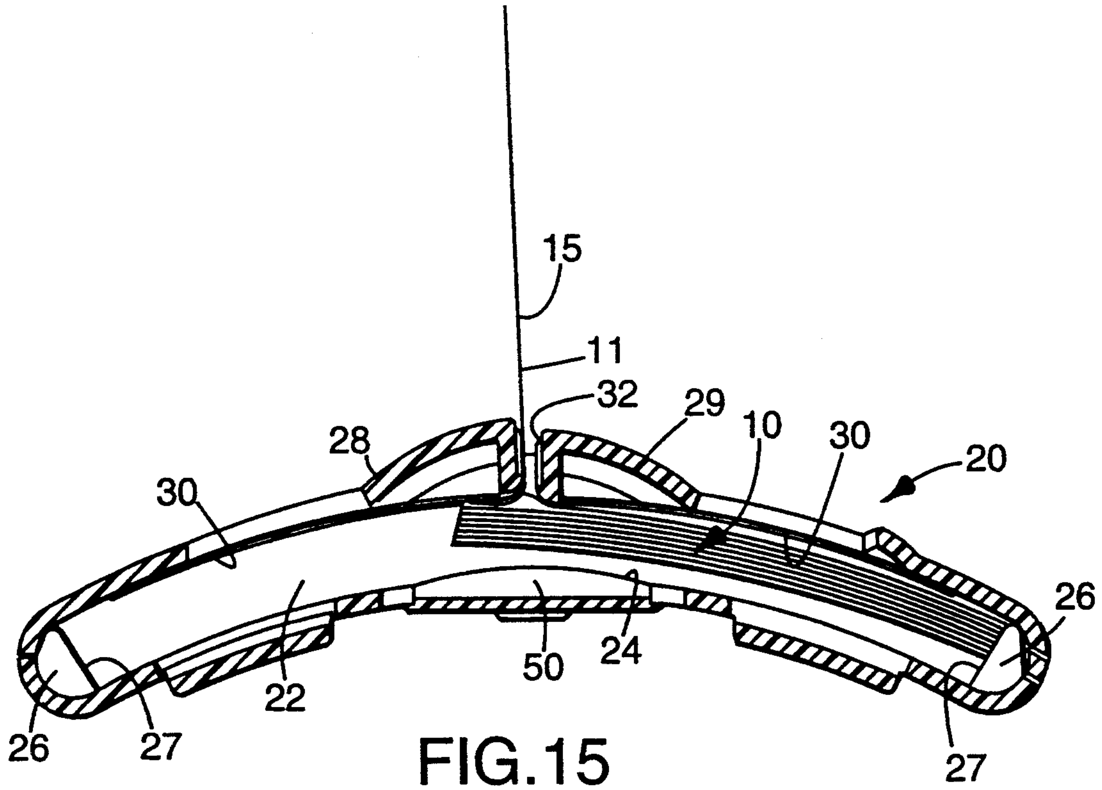
Figure 16:
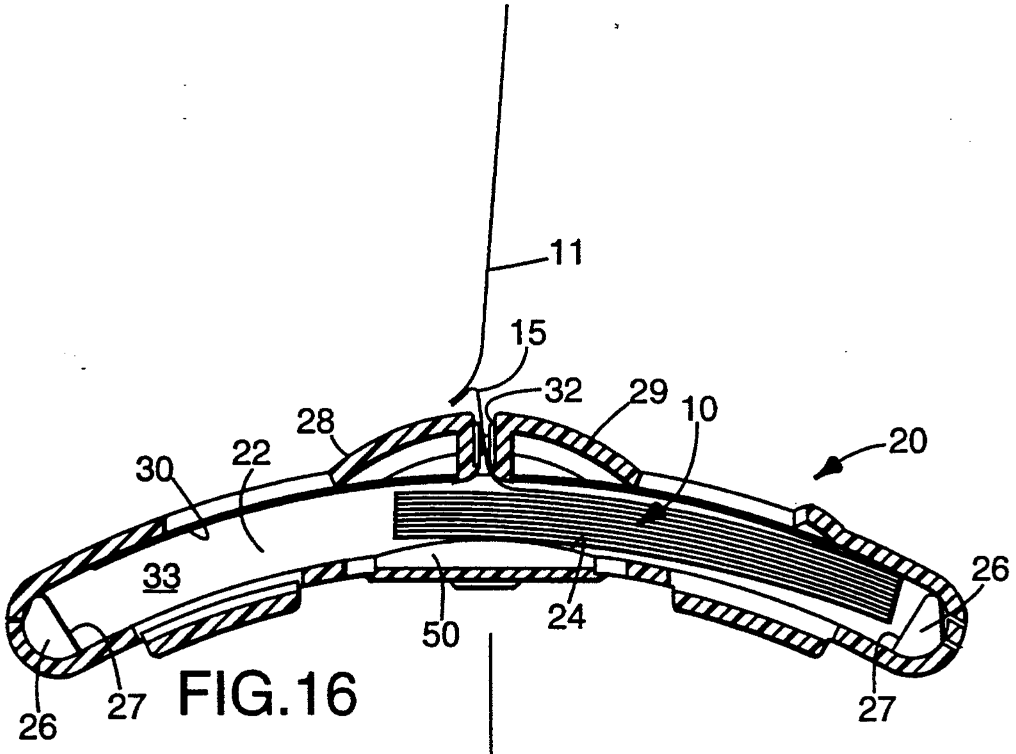
Figure 17:
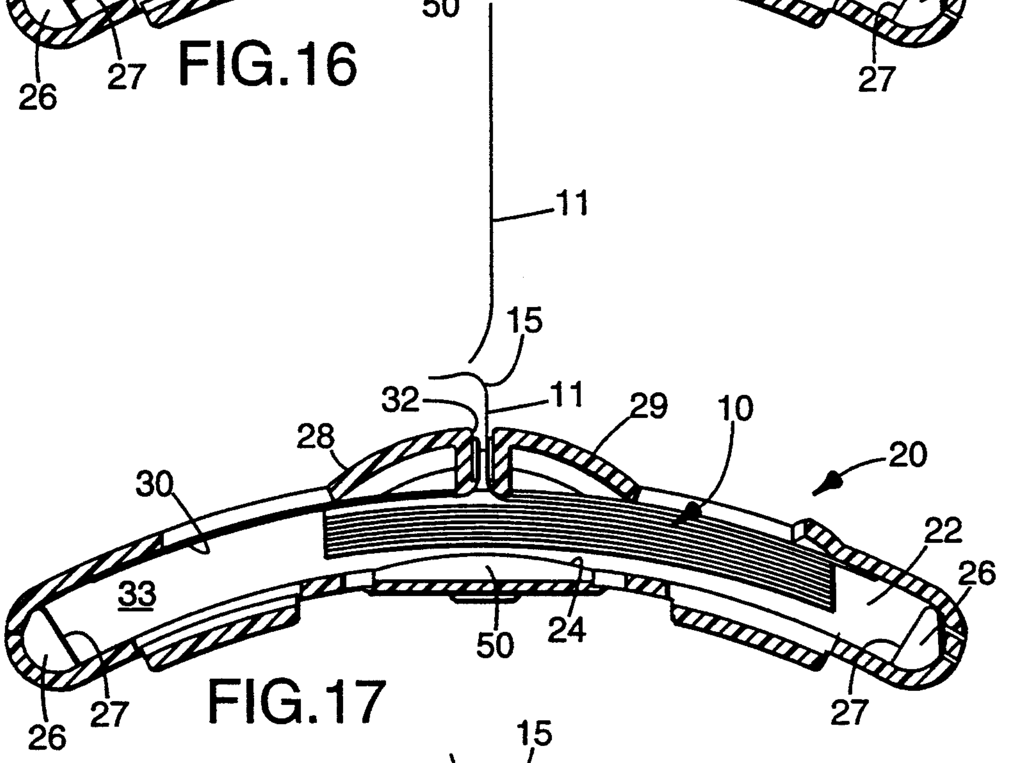
Figure 18:
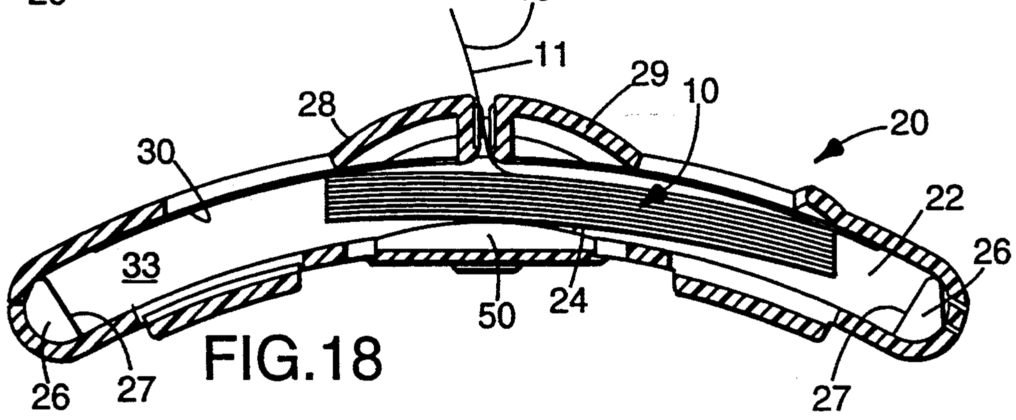

FIGS. 11 through 18 illustrate dispensing the top sheet 11 from the stack 10 of sheets 11 using the dispenser 20. As illustrated in FIG. 11, initially the stack 10 is positioned with its opposite ends contacting the top wall surface portions 30, with a portion of the stack 10 opposite the outlet opening 32 contacting the arcuate top surfaces of longitudinally extending ribs 50 defining the bottom surface 24 of the cavity 22 in that location so that the stack 10 is slightly bowed by the curved surfaces 30 and 24, and with the first end portion 15 of the uppermost sheet 11 in the stack 10 projection through the outlet opening 32. Initially when, as illustrated in FIG. 12, as tension is first applied to the first end portion 15 of the uppermost sheet 11 to pull it from the dispenser 20 through the outlet opening 32, the upper surface of the stack 10 will fully engage the arcuate top wall surface portions 30, and the stack 10 will begin to move along the cavity 22 as the uppermost sheet is pealed from the sheet beneath it. When, as illustrated in FIG. 13, the stack 10 of sheets 11 moves to a position with the first end portion 15 of the second sheet 11 in the stack beneath the outlet opening 32, that first end portion 15 will start to slide along the sheet 11 beneath it (initially the third sheet in the stack 10) causing a slight buckle in the second sheet 11 in the stack, which buckle increases significantly after movement of the stack 10 along the cavity 22 is stopped by contact with the end wall 26 as is illustrated in FIG. 14, whereafter, the top wall portion 28 around which the sheet 11 is being pulled will be flexed in the direction toward which the uppermost sheet 11 is being pulled as is illustrated in FIG. 15 to reduce the force required to pull the end of the uppermost sheet 11 adhered to the first end portion 15 of the second sheet through the outlet opening 32 to the position illustrated in FIG. 16, whereupon the first end portion 15 of what originally was the second sheet in the stack will be pulled through the outlet opening 32, causing the stack to move away from the adjacent end wall 26 as illustrated in FIG. 17 to the position illustrated in FIG. 18 where the uppermost sheet will be pealed away from what was originally the second sheet 11 in the stack 10 and now becomes the uppermost sheet 11 positioned in a position at the opposite end of the dispenser corresponding to that of the stack 10 before the sheet 11 was withdrawn with its first end portion 15 projecting through the outlet opening 32 where it too can be engaged to pull that sheet from the dispenser 20.

The dispenser 20 includes attaching means adapted for releasably attaching the dispenser 20 to several different retaining means for releasably retaining the dispenser 20 at predetermined locations.

Figure 19:
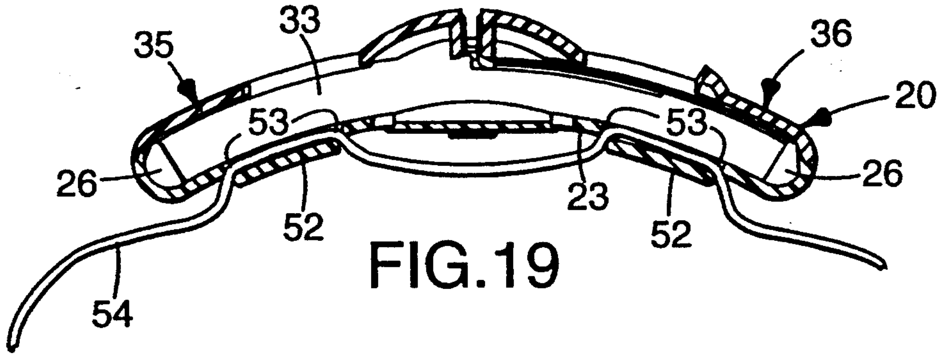
FIG. 19 is a cross sectional view of the sheet dispenser shown in FIG. 1 in combination with a strap by which the dispenser can be attached to a user's hand or wrist.

As can be seen in FIG. 19, those attaching means comprise (1) two transversely extending cantilevered strap receiving portions 52 included in the bottom wall 23, each of which strap receiving portions 52 is adjacent a different one of the end walls 26. The bottom wall 23 has transverse openings 53 along opposite edges of the strap receiving portions 52 affording positioning a strap 54 around the sides of the loop like portions 52 adjacent the cavity 22, by which strap 54 the dispenser 20 can be releasably secured with the outer surface 25 of the bottom wall 23 along a surface such as the top surface of a user's hand or wrist with the strap 54 extending around the palm of the user's hand, or around a user's wrist. The bottom wall 23 also has a side opening 55 along a different side of each of the strap receiving portions 52 (see FIGS. 4 and 5), which side openings 55 join the openings 53 along opposite edges of the strap receiving portions 52 and afford movement of the strap 54 sideways to its position on sides of the cantilevered strap receiving portions 52 adjacent the cavity 22. The strap receiving portions 52 each have a lip adjacent the side opening 55 projecting toward the cavity 22 and adapted to help retain the strap 54 along the side of the strap receiving portion 52 adjacent the cavity 22. The strap receiving portions 52 space the rest of the bottom wall 23 from the user's hand or wrist to provide ventilation beneath it, and help distribute the pressure applied to the user's hand or wrist by the strap 54. The strap 54 may be of elastic or non-elastic material, and ends of the strap 54 may be releasably joined by a conventional buckle or other attachment means (not shown) such as lengths of hook and loop fastener.

Figure 20:
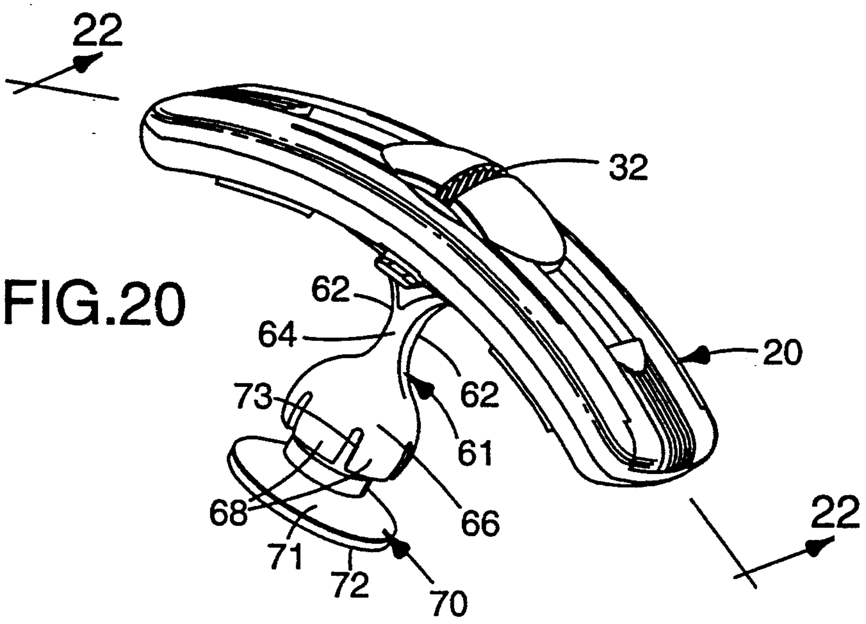
FIG. 20 is a perspective view of the sheet dispenser of FIG. 1 releasably engaged with a support member adapted to be held between a persons fingers.
Figure 21:
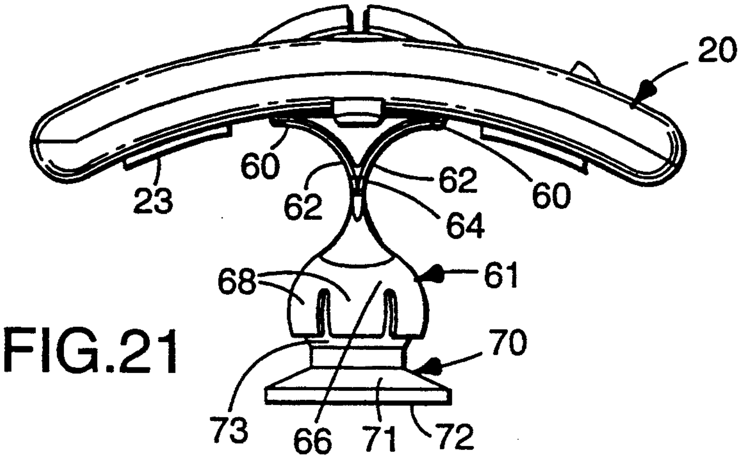
FIG. 21 is a side view of the sheet dispenser and support member shown in FIG. 20.
Figure 22:
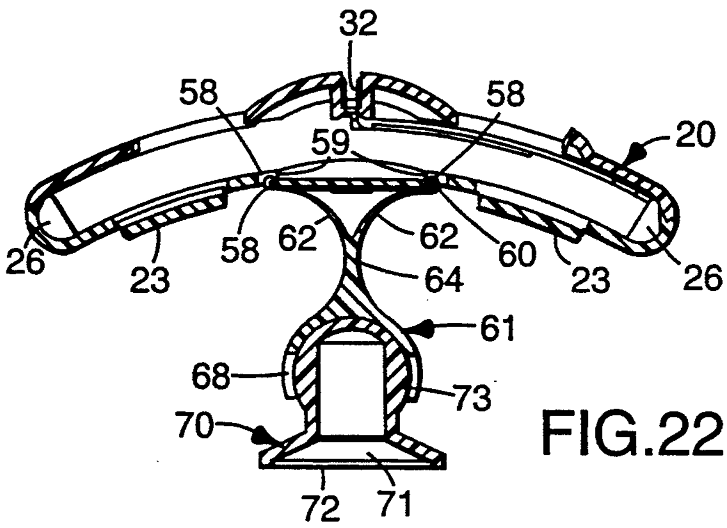
FIG. 22 is a sectional view taken approximately along line 22—22 of FIG. 20.

As can be seen in FIGS. 20 through 22, those attaching means also comprise (2) the bottom wall having two transversely extending openings 58 partially defined by lip like portions 59 of the bottom wall 23 extending toward the end walls 26 of the dispenser 20 on opposite sides of the central outlet opening 32. The lip-like portions 59 are adapted to be engaged by opposed hook-like distal end portions 60 of a support member 61 extending through the openings 58, which hook like distal end portions 60 provide means for releasably attaching the support member 61 to the bottom wall 23 of the dispenser 20. The support member 61 is adapted to be engaged by a user's fingers and has finger engagement surfaces 62 that face in opposite directions on opposite sides of the support member 61. The finger engagement surfaces 62 on the support member 61 are shaped to engage adjacent side surfaces of a user's fingers, and the support member 61 includes a narrow web like portion 64 between the finger engagement surfaces 62 adapted to comfortably extend between the fingers of a user positioned along the finger engagement surfaces 62. Also, the support member 61 includes a semi spherical retainer portion 66 wider than the web like portion 64 that is adapted to be positioned along the inner surfaces of a user's fingers. As illustrated, the finger engagement surfaces 62 that face in opposite directions on opposite sides of the support member 61 are arcuate around parallel axes so that they can fit closely along the surface of the fingers, however, the finger engagement surfaces 62 could have other contours that contact the side surfaces of the fingers only in spaced locations. Also as illustrated, the retainer portion 66 that is significantly wider than the web like portion 64 and is adapted to be positioned along the inner surface of a user's fingers is generally semi-spherical. The retainer portion 66 has parts including spaced projecting parts 68 around its distal end that define a socket opening through the side of the retainer portion 66 opposite the web like portion 64. The assembly further includes a pedestal 70 including a generally conical base portion 71 having a circular bottom surface 72 adapted to be attached to a substrate (e.g., by adhesive, a magnet or a suction cup), and a spherical portion 73 attached to the apex of the base portion 71 and adapted to be removably received in the socket with the projecting parts 68 frictionally and releasably engaging the spherical portion 73. The bottom surface 72 of such a pedestal 70 can be attached to a surface and used to support the retainer portion 66 at times when the user does not choose to support it between his fingers, and provide an anchor for the retainer portion 66 so that sheets 11 can be removed from the dispenser 20 with one hand when the retainer portion 66 is engaged with the pedestal 70. The retainer portion 66 can always be easily removed from the pedestal 70 by pulling it off of the spherical portion 73 so that it can again be positioned between a user's fingers to support the dispenser 20 along the back surface of the user's hand. The support member 61 could optionally be used to support different types of dispensers for sheets, tape or other items along the back surface of a user's hand. As an example, the dispenser package 32 illustrated in U.S. Pat. No. 4,907,825 could be modified for engagement by the opposed hook-like distal end portions 60 of the support member 61 by cutting spaced slots in its bottom wall 37. Optionally, those opposed hook-like distal end portions 60 of the support member 61 could be spaced to engage around the peripheral edge of that dispenser package 32.

As illustrated, those attaching means also comprise (3) the dispenser 20 having two docking tabs 76 extending in opposite directions from opposite sides of the bottom wall 23 of the dispenser 20 generally centrally along the length of the bottom wall 23 and having distal end portions spaced from the outer surface 25 of the bottom wall 23. The docking tabs 76 are adapted to be engaged in either a weighted base 78 (FIGS. 23, 24 and 25) or an un-weighted base 80 (FIGS. 26, 27 and 28), each of which bases 78 and 80 has, respectively, a top surface 82 or 83, a recessed surface 84 or 85 defining a recess from the top surface 82 or 83 of the base 78 or 80 that is adapted to closely receive the outer surface 25 of the dispenser 20, and retaining tabs 86 or 87 projecting into the recess from opposite sides at locations spaced from the recessed surface 84 or 85. Those retaining tabs 86 and 87 are adapted to engage the sides of the docking tabs 76 adjacent the outer surface 25 of the bottom wall 23 of the dispenser 20 in the recess in the base 78 or 80 to thereby releasably retain the dispenser 20 in a docked position in engagement with the base 78 or 80. The outer surface 25 of the bottom wall 23 includes curved cam surfaces adjacent its ends adapted for engagement with the top and recessed surfaces 82, 84 or 83, 85 of the base 78 or 80 to afford movement of the docking tabs 76 under the retaining tabs 86 or 87 while deflecting the bottom wall 23 or tabs 76 and/or 86 or 87 upon longitudinal movement of the bottom wall 23 along the recess from a disengaged position with the docking tabs 76 and retaining tabs 86 and 87 side by side. Also, the same cam surfaces afford movement of the docking tabs 76 from under the retaining tabs 86 or 87 while deflecting the bottom wall 23 or tabs 76 and/or 86 or 87 upon longitudinal movement of the bottom wall 23 along the recess from their engaged position to a disengaged position. The need to thus deflect the bottom wall 23 or tabs 76 and/or 86 or 87 provides a detent to releasably retain the dispenser 20 in the docked position in engagement with the base 78 or 80.

Figure 25:
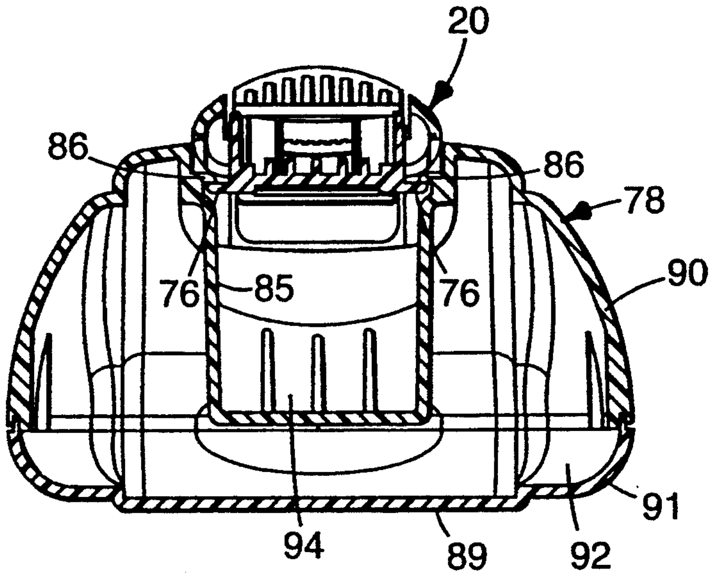
FIG. 25 is a sectional view taken approximately along line 25—25 of FIG. 23.
Figure 23:
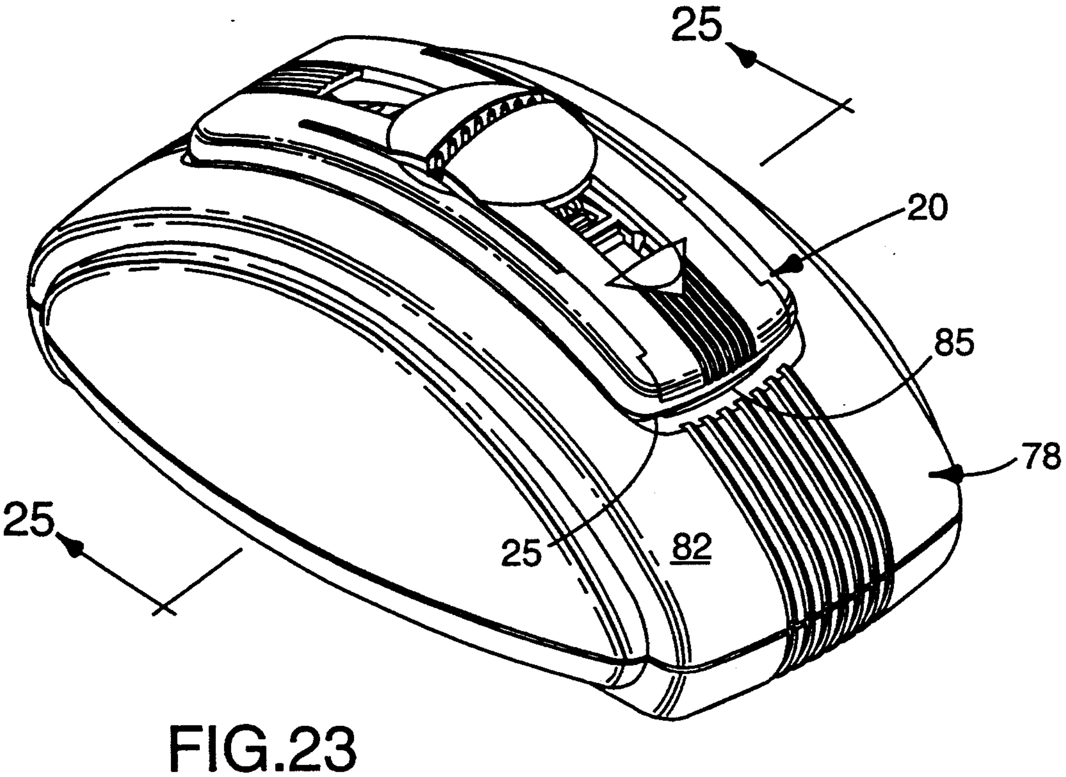
FIG. 23 is a perspective view of the sheet dispenser of FIG. 1 releasably engaged with a weighted base.
Figure 24:
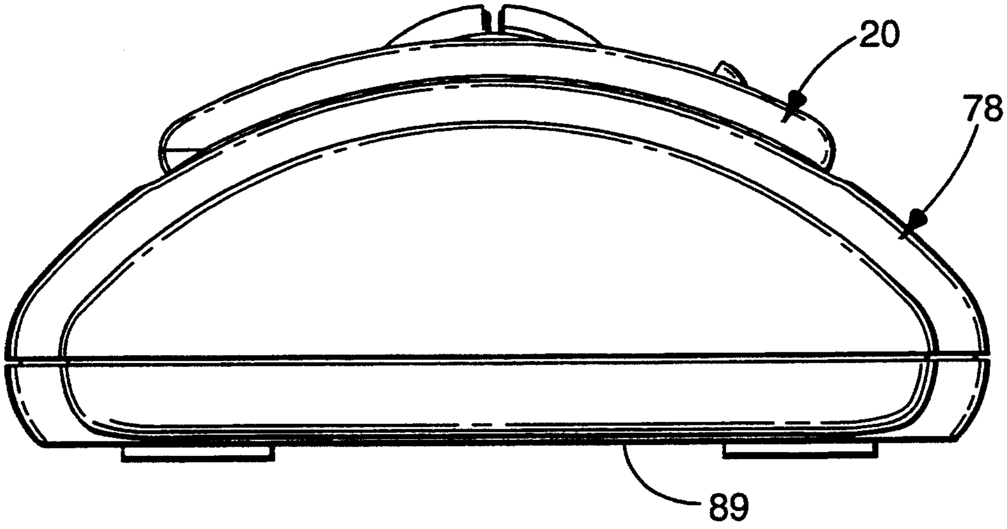
FIG. 24 is a side view of the sheet dispenser and weighted base shown in FIG. 23.

The weighted base 78 for use with the dispenser 20, illustrated in FIGS. 23, 24 and 25, has a bottom surface 89 adapted to be supported on a horizontal surface and has sufficient weight that one of the sheets 11 can be withdrawn from the dispenser 20 with one hand without moving the dispenser 20 attached to the weighted base 78. As can be seen in FIG. 25, the weighted base 78 includes two portions 90 and 91 having peripheries engaged and sealed together (e.g., by glue or heat fusion) to define a chamber 92 filled with ballast such as sand, gravel or rocks. As illustrated in FIG. 25, the weighted based 78 includes walls defining a replacement stack supply chamber 94 accessible from the top of the weighted base 78 when the dispenser 20 is removed from the base 78, which supply chamber 94 is adapted to receive and store a number (e.g., 4) of stacks 10 of sheets 11 prior to their use.

Figure 26:
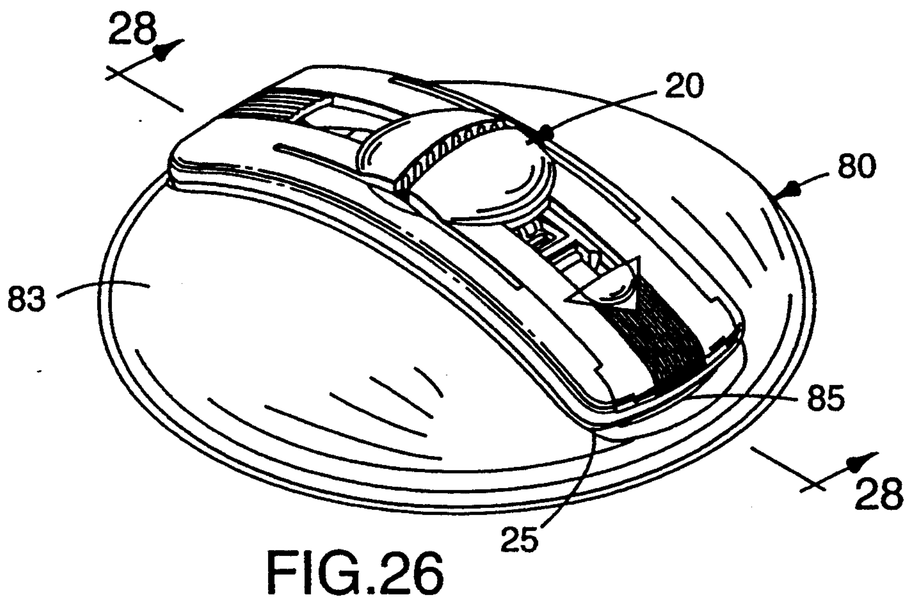
FIG. 26 is a perspective view of the sheet dispenser of FIG. 1 releasably engaged with a base adapted to be attached to a substrate.
Figure 27:
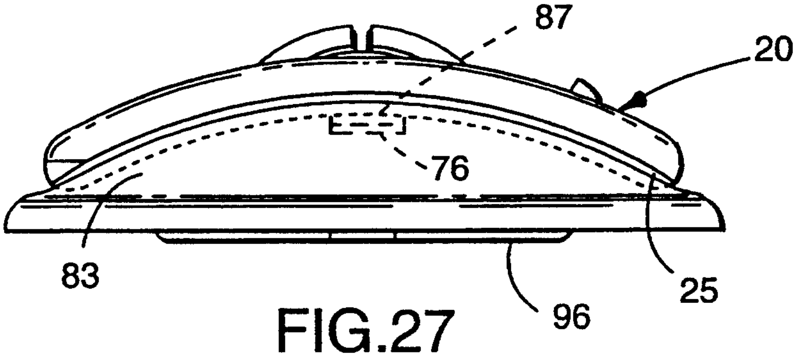
FIG. 27 is a side view of the sheet dispenser and base shown in FIG. 26.
Figure 28:
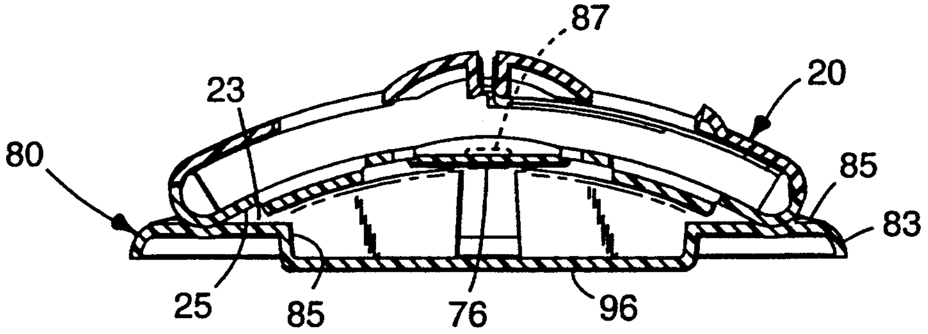
FIG. 28 is a sectional view taken approximately along line 28—28 of FIG. 26.

The un-weighted base 80 for use with the dispenser 20, illustrated in FIGS. 26, 27 and 28, is adapted to be attached to a horizontal or vertical surface so that one of the sheets 11 can be withdrawn from the dispenser 20 with one hand without detaching the un-weighted base 80 from the surface. The unweighted base 80 has a generally circular planar surface 96 on its side opposite the recess for the dispenser 20, which surface 96 can be attached to such a horizontal or vertical surface by means (not shown) such as a length of foam tape coated with pressure sensitive adhesive on both sides, a length of magnetic material such as plasteform, a suction cup, or a sheet of flexible material attached at its center to the center of the surface 96 in the manner described in U.S. Pat. No. 5,014,946, which flexible material then momentarily acts like a suction cup against a surface on which the unweighted base 80 is supported when a sheet 11 is withdrawn from the dispenser 20.

The present invention has now been described with reference to several embodiments thereof. It will be apparent to those skilled in the art that many changes or additions can be made in the embodiments described without departing from the scope of the present invention. Thus, the scope of the present invention should not be limited to the structures described in this application, but only by structures described by the language of the claims and the equivalents of those structures.

We claim:

1. An assembly including:

a dispenser for flexible sheets from a stack of sheets disposed one on top of another, said dispenser comprising:

walls having surfaces defining a cavity adapted to receive the stack and an outlet opening for said cavity through which individual sheets from the stack may be manually withdrawn, a support member for releasably retaining said dispenser along the back of a user's hand, said support member having finger engagement surfaces that face in opposite directions on opposite sides of said support member and are shaped to engage side surfaces of two adjacent fingers on a user's hand, said support member including a narrow web like portion having opposite ends and opposite surfaces extending between said ends defining portions of said finger engagement surfaces, said narrow web like portion being adapted to comfortably extend between two adjacent fingers on a user's hand, and a retainer portion at one end of said narrow web like portion, said retainer portion being significantly wider than said web like portion and projecting in two opposite directions from the portions of the finger engagement surfaces on the web like portion to define additional portions of said finger engagement surfaces adapted to be positioned along inner surfaces of two adjacent fingers on a user's hand between which the web like portion is positioned, and means at the end of the web-like portion opposite said retainer portion and on said dispenser for attaching said support member to said dispenser.

2. An assembly according to claim 1 wherein said walls include a bottom wall defining a bottom surface for said cavity and an opposite outer surface and end walls defining end surfaces for said cavity at opposite ends of said bottom wall, said outlet opening is located generally centrally between said end walls, and said means at the end of the web-like portion opposite said retaining portion for releasably attaching said support member to the bottom wall of said dispenser comprises said bottom wall having two transversely extending openings partially defined by lip like portions of said bottom wall extending toward the end walls of said dispenser on opposite sides of said central outlet opening, and opposed hook-like distal end portions of said support member extending through said openings and releasably engaged with said lip like portions.

3. An assembly according to claim 1 wherein said finger engagement surfaces are arcuate around parallel axes.

4. An assembly according to claim 1 wherein said retainer portion is generally semi-spherical and has parts including spaced projecting parts defining a socket opening through the side of said retainer portion opposite said web like portion; and said assembly further includes a pedestal including a base portion adapted to be attached to a substrate, and a spherical portion attached to said base portion and adapted to be received in said socket with said projecting parts frictionally and releasably engaging said spherical portion.

5. An assembly including:

a dispenser for flexible sheets from a stack of sheets disposed one on top of another, said dispenser comprising:

walls having surfaces defining a cavity adapted to receive the stack and an outlet opening for said cavity through which individual sheets from the stack may be manually withdrawn, said walls including an elongate bottom wall defining a bottom surface for said cavity and an opposite outer surface, said bottom wall having two docking tabs extending in opposite directions from opposite sides of said bottom wall generally centrally along said bottom wall and having distal end portions spaced from said outer surface; and a base having a top surface, a recessed surface defining a recess from the top surface of said base closely receiving the outer surface of the bottom wall of the dispenser, and retaining tabs projecting into said recess from opposite sides at locations spaced from said recessed surface, said retaining tabs being positioned along the side of said docking tabs adjacent said outer surface of the bottom wall to retain the bottom wall of the dispenser in the recess in the base and thereby releasably retain the dispenser in engagement with the base, said top surface of said base and said bottom surface of said dispenser having cam surfaces adapted to afford movement of said docking tabs under said retaining tabs by resilient deflection of said bottom wall or tabs upon longitudinal movement of said bottom wall into said recess, and to afford movement of said docking tabs out from under said retaining tabs by resilient deflection of said bottom wall or tabs upon longitudinal movement of said bottom wall out of said recess.

6. An assembly according to claim 5 wherein said base is weighted and adapted to be supported on a substrate.

7. An assembly according to claim 5 wherein said base is adapted to be attached to a substrate by either adhesive, a suction cup or magnetic material.

8. A support member adapted to support a dispenser for materials, said support member comprising:

finger engagement surfaces that face in opposite directions on opposite sides of said support member and are shaped to engage side surfaces of two adjacent fingers on a user's hand, said support member including a narrow web like portion having opposite ends and opposite surfaces extending between said ends defining portions of said finger engagement surfaces, said narrow web like portion being adapted to comfortably extend between two adjacent fingers on a user's hand, and a retainer portion at one end of said narrow web like portion, said retainer portion being significantly wider than said web like portion and projecting in two opposite directions from the portions of the finger engagement surfaces on the web like portion to define additional portions of said finger engagement surfaces adapted to be positioned along inner surfaces of two adjacent fingers on a user's hand between which the web like portion is positioned; and means at the end of the web-like portion opposite said retainer portion adapted for attaching said support member to the dispenser.

9. An assembly according to claim 8 wherein said finger engagement surfaces are arcuate around parallel axes.

10. An assembly according to claim 8 wherein said retainer portion is generally semi-spherical and has parts including spaced projecting parts defining a socket opening through the side of said retainer portion opposite said web like portion; and said assembly further includes a pedestal including a base portion adapted to be attached to a substrate, and a spherical portion attached to said base portion and adapted to be received in said socket with said projecting parts frictionally and releasably engaging said spherical portion.

11. An assembly including:

a dispenser for flexible sheets from a stack of sheets disposed one on top of another, said dispenser comprising:

walls having surfaces defining a cavity adapted to receive the stack and an outlet opening for said cavity through which individual sheets from the stack may be manually withdrawn, said walls including a bottom wall defining a bottom surface for said cavity and an opposite outer surface, attaching means on said dispenser adapted for releasably attaching said dispenser to several different retaining means for releasably retaining said dispenser at predetermined locations, said attaching means comprising:

said bottom wall including two transversely extending strap receiving portions each adjacent a different one of said end walls and said bottom wall having transverse openings along opposite edges of said strap receiving portions affording positioning a strap around the sides of said strap receiving portions adjacent said cavity by which strap the dispenser can be releasably secured with the outer surface of the bottom wall along a surface such as the top surface of a user's hand with the strap extending around the palm of the user's hand;

said bottom wall having two transversely extending openings partially defined by lip like portions of said bottom wall extending toward the end walls of said dispenser on opposite sides of said central opening, said lip-like portions being adapted to be engaged by opposed hook-like distal end portions of a support member extending through said openings, which support member has finger engagement surfaces that face in opposite directions on opposite sides of said support member, the finger engagement surfaces being shaped to engage adjacent side surfaces of a user's fingers, said support member including a narrow web like portion between said finger engagement surfaces adapted to comfortably extend between a user's fingers positioned along said finger engagement surfaces, and a retainer portion wider than said web like portion adapted to be positioned along the inner surfaces of a user's fingers; and said bottom wall having two docking tabs extending in opposite directions from opposite sides of said bottom wall generally centrally along said bottom wall and having distal end portions spaced from said outer surface; said docking tabs being adapted to be engaged in a base having a top surface, a recessed surface defining a recess from the top surface of said base adapted to closely receive the outer surface of the dispenser, and retaining tabs projecting into the recess from opposite sides at locations spaced from the recessed surface, the retaining tabs being adapted to engage with the sides of said docking tabs adjacent said bottom surface of the dispenser to retain the bottom wall of the dispenser in the recess in the base and thereby releasably retain the dispenser in engagement with the base, said bottom surface of said dispenser having cam surfaces adapted for engagement with the surfaces of the base to afford movement of the docking tabs under the retaining tabs while deflecting the bottom wall or tabs upon longitudinal movement of said bottom wall along the recess; which base is either weighted and adapted to be supported on a substrate or adapted to be attached to a substrate by means such as adhesive, suction cups or magnetic material.

12. An assembly including:

a dispenser for flexible sheets from a stack of sheets disposed one on top of another, said dispenser comprising:

walls having surfaces defining a cavity adapted to receive the stack and an outlet opening for said cavity through which individual sheets from the stack may be manually withdrawn, said walls including a bottom wall defining a bottom surface for said cavity and an opposite outer surface, and end walls defining end surfaces for said cavity at opposite ends of said bottom wall with said outlet opening being located generally centrally between said end walls, a support member for releasably retaining said dispenser along the back of a user's hand, said support member having finger engagement surfaces that face in opposite directions on opposite sides of said support member and are shaped to engage side surfaces of a user's fingers, said support member including a narrow web like portion between said surfaces adapted to comfortably extend between a user's fingers along said finger engagement surfaces and a retainer portion significantly wider than said web like portion adapted to be positioned along the inner surface of a user's fingers, and means at the end of the web-like portion opposite said retainer portion and on said walls for releasably attaching said support member to the bottom wall of said dispenser, said means comprising said bottom wall having two transversely extending openings partially defined by lip like portions of said bottom wall extending toward the end walls of said dispenser on opposite sides of said central outlet opening, and opposed hook-like distal end portions of said support member extending through said openings and releasably engaged with said lip like portions.

* * * * *